(12) United States Patent
Tang et al.

(10) Patent No.: US 6,347,095 B1
(45) Date of Patent: Feb. 12, 2002

(54) SYSTEM, DEVICES AND METHODS FOR USE IN PROXIMITY-BASED NETWORKING

(75) Inventors: Hong Da Tang; Chanakya C. Damarla; Mark D. Pollard, all of Pittsburgh, PA (US)

(73) Assignee: PanGo Networks, Inc., Pittsburgh, PA (US)

( * ) Notice: Subject to any disclaimer, the term of this patent is extended or adjusted under 35 U.S.C. 154(b) by 0 days.

(21) Appl. No.: 09/592,928

(22) Filed: Jun. 13, 2000

Related U.S. Application Data (60) Provisional application No. 60/165,540, filed on Nov. 15, 1999.

(51) Int. Cl.[7] .............................. H04Q 7/00; H04B 7/00; G08B 5/22
(52) U.S. Cl. .................. 370/469; 370/328; 340/825.36; 340/825.49
(58) Field of Search .............................. 370/277–278, 370/282, 328, 338, 310, 469; 455/41, 39, 88, 352–353, 100; 340/825.22, 825.69, 825.72, 825.36, 825.49; 380/270; 713/200–201

(56) References Cited

U.S. PATENT DOCUMENTS

| | | | | |
|---|---|---|---|---|
| 5,796,827 A | * | 8/1998 | Coppersmith et al. | ...... 455/100 |
| 5,898,831 A | * | 4/1999 | Hall et al. | .................. 713/201 |
| 5,953,425 A | * | 9/1999 | Selker | ........................ 380/270 |
| 6,069,896 A | * | 5/2000 | Borgstahl et al. | ........... 370/338 |

* cited by examiner

*Primary Examiner*—Wellington Chin
*Assistant Examiner*—Maikhanh Tran
(74) *Attorney, Agent, or Firm*—Bartony & Hare (57) ABSTRACT

In general, the present invention provides in one aspect thereof a device for proximity-based communication between the device and at least a second device. The device preferably includes: a communication unit adapted to communicate between the first device and the second device in a wireless manner; a network layer that includes a communication specification for communicating information between the device and the second device through the communication unit, the network layer being adapted to determine or detect physical proximity between the device and the second device and communicate information regarding detection of physical proximity between the device and the second device or a lack of detection of physical proximity between the device and the second device; a PAN Cell Management layer that receives the physical proximity information from the network layer over time, the PAN Cell Management layer translating the physical proximity detection information received over time into time- and proximity-based events; and an application layer including a memory in which at least one computer application is stored, the PAN Cell Management layer communicating information of occurrence of at least one of the proximity-based events to the computer application so that the computer application can perform a task programmed to be performed on occurrence of the one of the proximity-based events.

19 Claims, 7 Drawing Sheets

SYSTEM, DEVICES AND METHODS FOR USE IN PROXIMITY-BASED NETWORKING

RELATED APPLICATION

U.S. Provisional patent application Ser. No. 60/165,540 entitled SYSTEMS, DEVICES AND METHODS FOR USE IN PROXIMITY-BASED NETWORKING filed Nov. 15, 1999, the disclosure of which is incorporated herein by reference.

FIELD OF THE INVENTION

The present invention relates to systems, devices and methods for use in proximity-based networking and, especially, to systems, devices and methods for use in proximity-based networking and programming using wireless communication.

BACKGROUND OF THE INVENTION

Low cost information access devices (such as cellular phones and hand held computers) are becoming ubiquitous and traditional laptops and personal computers are quickly evolving to more readily operate in a wireless environment. As these devices are able to directly and indirectly interact with each other over short-range, wireless communications (for example, radio frequency) systems, a new class of applications will emerge.

The present invention provides a programming paradigm to facilitate such new applications.

SUMMARY OF THE INVENTION

In general, the present invention provides, in one aspect thereof, a device for proximity-based communication between the device and at least a second device. The device preferably includes:

a communication unit adapted to communicate between the first device and the second device in a wireless manner;

a network layer that includes a communication specification for communicating information between the device and the second device through the communication unit, the network layer being adapted to determine or detect physical proximity between the device and the second device and communicate information regarding detection of physical proximity between the device and the second device or a lack of detection of physical proximity between the device and the second device;

a PAN Cell Management layer that receives the physical proximity information from the network layer over time, the PAN Cell Management layer translating the physical proximity detection information received over time into time- and proximity-based events;

an application layer including a memory in which at least one computer application is stored, the PAN Cell Management layer communicating information of occurrence of at least one of the proximity-based events to the computer application so that the computer application can perform a task programmed to be performed on the occurrence of one of the proximity-based events.

The device preferably further includes a network protocol layer that includes a protocol for transmission of data between the device and the second device through the network layer. The network protocol layer preferably communicates information in packets.

Preferably, each of the network layer, the network protocol layer, the PAN Cell Management layer and the proximity applications layer are embodied in software stored in the memory of the device.

The PAN Cell Management layer preferably aggregates recurring physical proximity detection information (that is, physical proximity or lack of physical proximity) received from the network layer over time. The PAN Cell Management layer preferably translates the detection information received over time into one of the time- and proximity-based events. Each of the time- and proximity-based events is thus a representation of the proximity of the device in relation to the second device at the time of translation. Example of time- and proximity-based events include, but are not limited to, an entered device proximity event, a still within device proximity event, a temporarily left device proximity event, a returned to device proximity event, and an exited device proximity event.

The task performed by the computer application can, for example, include communication of data to the second device or to a third device. The third device can, for example, be in "hardwired" communication with the device. Alternatively, the third device may be in proximity with the device and the communication with the third device may be wireless communication through the communication unit.

In a further aspect, the present invention provides a system including a plurality of devices as described above.

The communication unit, the network layer, the PAN Cell Management layer and the application layer can, for example, reside in a single mobile device. Moreover, the communication unit and the network layer can be stationary or location bound and be separated in location from the PAN Cell Management layer and the application layer. In general, the functionalities of the network layer and the functionalities of the PAN Cell Management layer are split into two devices. A plurality of communication unit and network layer pairings can also be provided with each such pairing being located at a different position. Each such pairing is preferably operable to detect proximity with a mobile device and communicate information regarding detection of physical proximity of the mobile device to the PAN Cell Management layer.

In another aspect, the present invention provides a method for event-based programming that operates upon the basis of proximity over time between a first device and at least a second device. The method includes the steps of:

registering in a memory of the first device an application that performs a task on the basis of the occurrence of at least one of a plurality of time- and proximity-based events;

detecting if the first device and the second device are in physical proximity in a recurring manner over time;

aggregating recurring detection or lack of detection of physical proximity of the first device and the second device over time to produce the time-and proximity-based events, the time- and proximity-based events being representative of the proximity of the device in relation to the second device at the time of production thereof; and communicating at least one of the time- and proximity-based events to the registered application.

As discussed above the time- and proximity-based events may include an entered device proximity event, a still within device proximity event, a temporarily left device proximity event, a returned to device proximity event, and an exited device proximity event. It is appreciated that anyone skilled in the art could readily use the same programming model in an environment comprised of a plurality of devices incorporating functionalities described above in the specialized entities.

In still a further aspect, the present invention provides a method for event-based programming that operates upon the basis of proximity over time between a plurality of stationary communication/detection devices in communication with a stationary computing device and at least one mobile device. The method includes the steps of:

- positioning each of the stationary communication/detection devices at a unique position within an area;
- storing in the memory of the computing device an application that performs a task on the basis of the occurrence of at least one of a plurality of time- and proximity-based events;
- detecting if the mobile device is in physical proximity with each of the stationary communication/detection devices in a recurring manner over time;
- aggregating recurring detection or lack of detection of the proximity of each of the stationary communication/detection devices and the mobile device over time to produce the time-and proximity-based events, the time- and proximity-based events being representative of the proximity of the mobile device to the area at the time of production thereof;
- communicating at least one of the time- and proximity-based events to the registered application.

Once again, the time- and proximity-based events can, for example, include an entered area proximity event, a still within area proximity event, a temporarily left area proximity event, a returned to area proximity event, and an exited area proximity event.

DETAILED DESCRIPTION OF THE INVENTION

The present invention, anticipating a world in which devices with short-range, wireless communication systems become common, enables and/or facilitates electronic monitoring of the physical proximity between electronic devices and translates physical proximity detection or lack of physical proximity detection over time into a time-and proximity-based event. Together these events form the foundation of the time- and proximity-based event-programming model. This event-based programming model preferably specifies the way in which computer programs attach the behavior that devices should exhibit upon occurrence of a time- and proximity-based event (for example, when such devices enter, leave, comeback into, exit or are still within each other's physical proximity).

In that regard, the present invention preferably establishes a "lifecycle" for time- and proximity-based events in a wireless networking environment. The present invention enables computer programs adhering to or compliant with the event-based programming model thereof to respond to the physical proximity of other electronic devices without regard for the underlying wireless networking technology. In general, the present invention monitors physical proximity over time, and translates proximity-related changes in state (detection and non-detection) into higher level constructs that application developers can use to specify the behavior of applications executing on a device based upon the proximity of the device in relation to other nearby electronic devices.

Proximity-based applications preferably recognize when other devices are near them, query the nearby devices for the applications that they support, and, optionally, decide to communicate with or use some of these applications. The process of recognizing when devices are near each other, querying these devices for the applications that they support and optionally running some of these applications are referred to as time- and proximity-based interactions in that physical proximity recurring over time between devices triggers the interactions.

Personal Area Networks

Proximity-based applications are preferably designed or built upon the concept of a Personal Area Network (PAN). Personal Area Networks are a known concept in the field of ubiquitous computing. However, as used herein, the terms "Personal Area Network" or "PAN" refer generally to a set of communications devices that are within range of each other (typically, within a relatively short-range—for example, within approximately ten meters).

Figure 1:
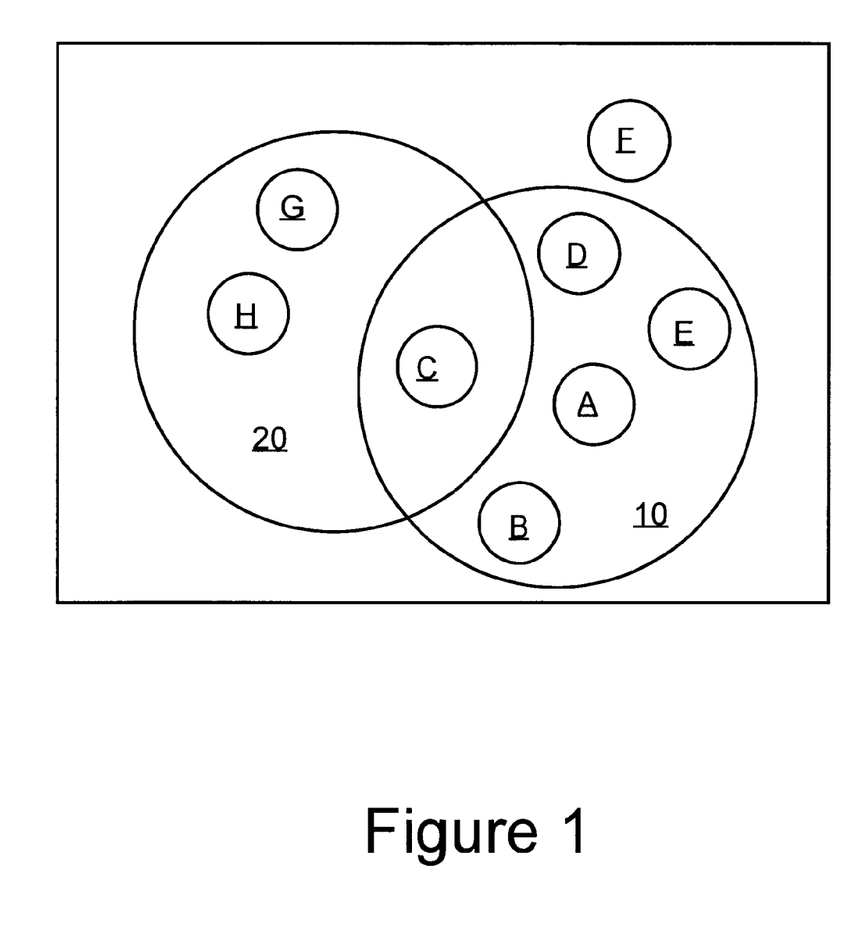
FIG. 1 illustrates an embodiment of a Personal Area Network.

The concept of a Personal Area Network can be further explained with reference to FIG. 1, in which each of the small circles A through H represents a short-range communications device. Devices within the range of a particular short-range communications device form that device's Personal Area Network. For example, large circle centered at device A in FIG. 1 encompasses device A's PAN 10. In FIG. 1, device A's PAN 10 includes devices B, C, D and E. In other words, devices B, C, D and E are short-range communications devices within range of device A (that is, device B, C, D and E can communicate with device A. Device C is also a part of device H's PAN 20, but device H's PAN 20 does not include devices A, B, D or E. In that regard, device C is within communication range of device H but devices A, B, D and E are not within communication range of device H. Personal Area Networks are thus based on the physical proximity of devices to each other, and include the set of devices that can communicate with a particular device at a given moment in time.

In the context of a PAN, proximity-based applications can be defined as applications that have behavior or tasks that are programmed to occur upon the occurrence of a time- and proximity-based event or during a time/proximity based state (for example, when devices enter, are still within, leave, comeback into and/or exit each other's PANs).

Architecture

Figure 2:
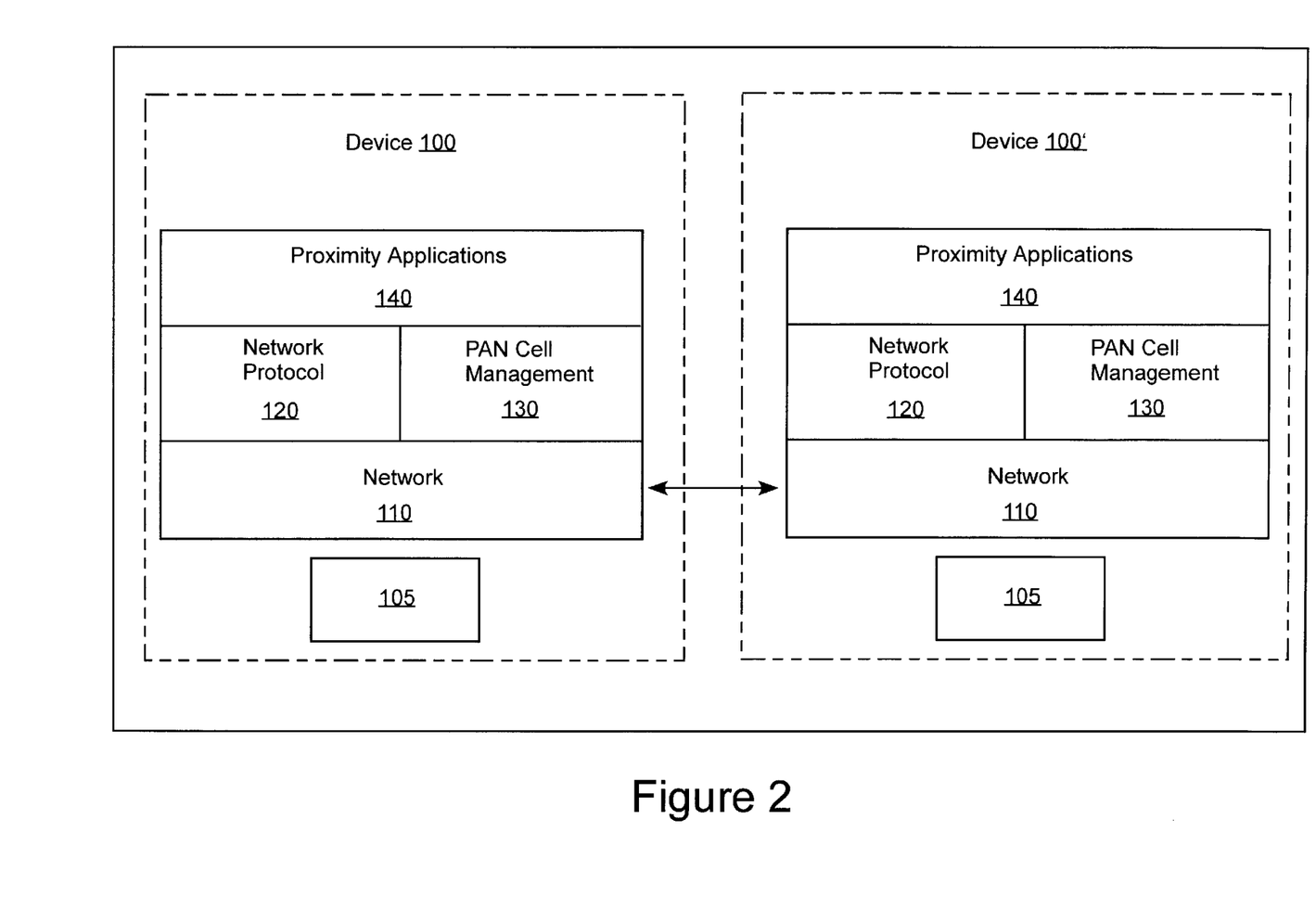
FIG. 2 illustrates an embodiment of a layered architecture for developing and deploying proximity based applications.

FIG. 2 illustrates an embodiment of a layered architecture for developing and deploying proximity-based applications between, for example, a device 100 and a device 100'.

Network

Network layer 110 of devices 100 and 100' is a short-range communications medium or specification that communicates through communication unit 105. Network layer 110 preferably provides higher layers with functionality that enables data (for example, data packets) to be sent from one device to another. Network layer 110 also preferably provides mechanisms for the determination or detection of physical proximity. Examples of short-range communications media or specification suitable for use in the present invention include IR and short-range radio solutions such as the Bluetooth™ Technology of the Bluetooth Special Interest Group as set forth in the Bluetooth Specification Release 1.0. The Bluetooth specification specifies a system solution comprising hardware, software and interoperability requirements and operates in a common 2.4 GHZ ISM band.

Network Protocol

Network Protocol layer 120 is built on top of raw network layer 110. Network Protocol layer 120 preferably provides support for routing data, preferably in the form of packets, between devices and assembling/disassembling large amounts of data into a format (for example, packets) that network 110 layer can transport. Examples of network protocols suitable for use in the present invention include TCP/IP, UDP/IP and IPX.

PAN Cell Management

PAN Cell Management layer 130 is preferably also built on top of network layer 110. Pan Cell Management layer 130 preferably takes information regarding detection of physical proximity over time from network layer 110 and translates this detection information into higher-level time- and proximity-based events such as Enter, StillHere, Leave, Comeback and Exit. Examples of data structures suitable for use to perform this translation are described below.

PAN Cell Management layer 130 also preferably provides a mechanism or mechanisms that allow Proximity Applications to register interest in specific events. For example, a "people finder" application may register interest in all proximity events associated with other people finder applications. In other words, when the people finder Proximity Application registers an interest in such events, it is requesting to be notified of proximity events of other devices having a people finder application stored thereon.

The discovery of an application on a remote device is a known process in the computer arts. Examples of such application discovery processes include Salutation by The Salutation Consortium™ and Java™ Jini™ available from Sun Microsystems, Inc. of Palo Alto, Calif.

Proximity Applications

Proximity application layer 140 preferably includes one or more applications that receive the high-level time- and proximity-based events specified by PAN Cell Management layer 130 and perform some specified task or behavior triggered by such events. Thus, proximity applications are preferably completely independent of underlying network layer 110.

The architecture of FIG. 2 is explained further with reference to the following example:

1. A device X has a PAN including 0 other devices.
2. A device Y has a PAN including 0 other devices.
3. At some point, X and Y come into physical proximity: X detects Y's physical proximity and Y detects X's physical proximity preferably using communication unit 105 such as the Bluetooth chip available from Digianswer A/S of Denmark, which supports the Bluetooth specification and is in communication with (or is part of) network layer 110.
4. Network layers 110 of devices X and Y forward recurring detection of physical proximity to X's and Y's PAN Cell Management layers 130. The first detection of physical proximity is translated into an Enter event. PAN Cell Management layer 130 of each of device X and Y converts detection of proximity over time into other time- and proximity-based events.
5. Using application discovery, X and Y preferably discover the proximity applications the other device supports upon the initial detection of physical proximity.
6. Based on interests registered to PAN Cell Management layer 130 by a device's proximity applications, some of those proximity applications will be notified of the Enter event and subsequent time- and proximity-based events of a particular device.

Description of PAN Cell Management

Figure 3:
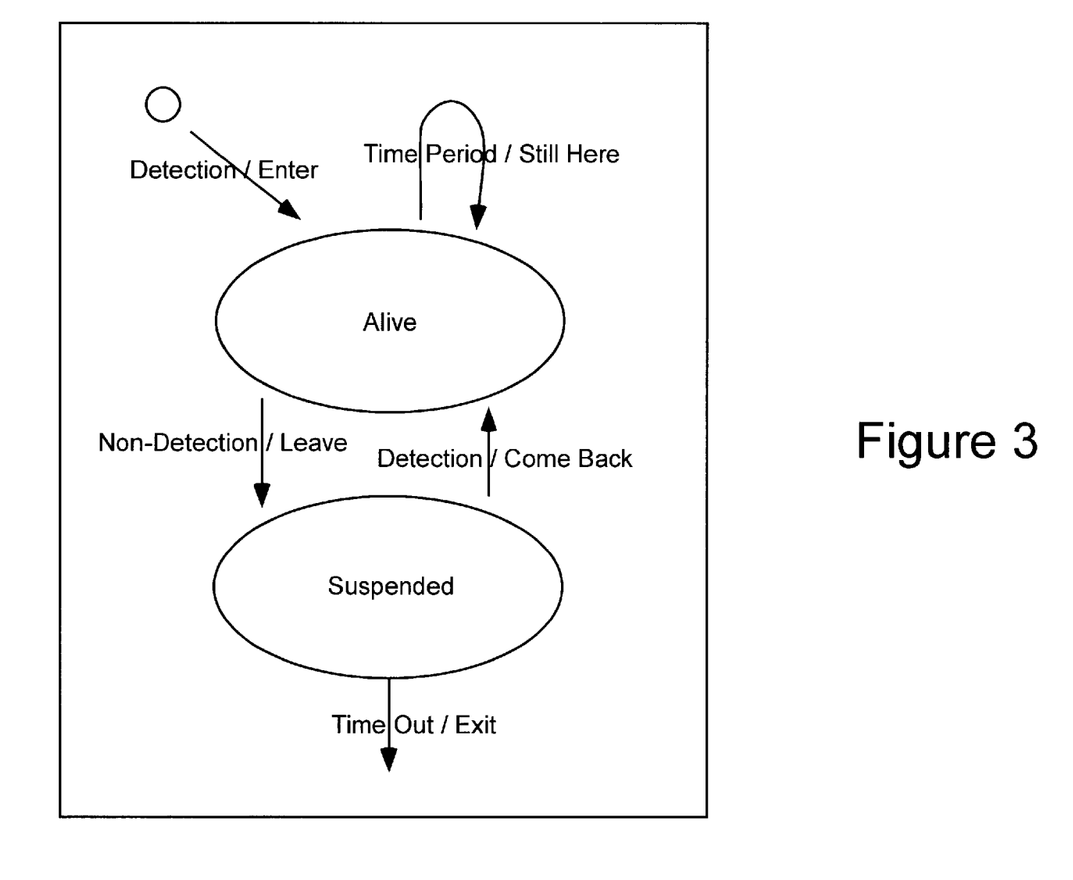
FIG. 3 illustrates a state diagram representing translation of the detection or lack of detection of proximity into higher-level events or state changes such as Enter, StillHere, Leave, ComeBack and Exit events.

FIG. 3 illustrates a state diagram that describes the translation of the detection or lack of detection of physical proximity into the higher-level proximity-based events such as Enter, StillHere, Leave, ComeBack and Exit as illustrated in FIG. 3.

In the embodiment of FIG. 3, PAN Cell Management layer 130 preferably keeps track of two pools of devices referred to as an Alive Pool and a Suspended Pool. The Alive Pool includes devices PAN Cell Management layer 130 knows to be "alive" within its PAN at any given moment in time. The Suspended Pool includes devices PAN Cell Management layer 130 formerly knew about. The devices of the Suspended Pool are currently not within physical proximity of the device, but these devices were in the physical proximity of the device within a certain amount of time prior to the current time.

Using these two pools. PAN Cell Management layer 130 generates time- and priority-based events in the following manner, in which the exemplary events Enter, StillHere, Leave, ComeBack and Exit are described:

Enter

When PAN Cell Management layer 130 detects physical proximity with a given device for the first time it preferably fires an Enter event and places this device in the Alive Pool.

StillHere

At periodic intervals (potentially user and/or developer specified) All subsequent detections of proximity for a device in the Alive Pool preferably cause PAN Cell Management layer 130 to fire a StillHere event.

Leave

If physical proximity is not detected for a device in the Alive Pool, then a Leave event is preferably fired. The device is now moved to the Suspended Pool.

Comeback

If physical proximity is detected for a device in the Suspended Pool within a certain period of time (potentially user and/or developer specified), then a Comeback event is preferably fired and the device is moved to the Alive Pool.

Exit

If physical proximity is not detected for a device in the Suspended pool for the given amount of time in which a Comeback event can be fired, then an Exit event is preferably fired.

Techniques for implementing these types of event system are well known in the art. Although clearly other means of implementation are available to implement the system herein described.

Example of Proximity Applications

The proximity-based applications in Proximity Application layer 140 of the architecture of FIG. 2 need only specify the task or behavior that the application should exhibit in response to the time- and proximity-based events supplied by the PAN Cell Management layer (for example, Enter, StillHere, Leave, ComeBack and Exit events). The following example illustrates the operation of one embodiment of a proximity-based application:

Suppose that one wishes to write a People Finder Application that will display people who are currently within a device user's PAN.

The Enter event would query the other device for the name of the person owning the device and update the user interface with this name. The Leave event would temporarily remove the name of the person owning the device that left the current PAN from the user interface. The Comeback event would restore the name to the user interface. The Exit event would "permanently" remove the name from the user interface until any subsequent Enter event for the device of that user.

The above example illustrates a peer-to-peer proximity-based application between two mobile proximity devices. Many other communication routes are possible. For example, it is also possible for an application to forward the proximity events to a third party application (that is, to an application on a third device) that implements the behavior that should be displayed when events of interest occur.

Figure 4:
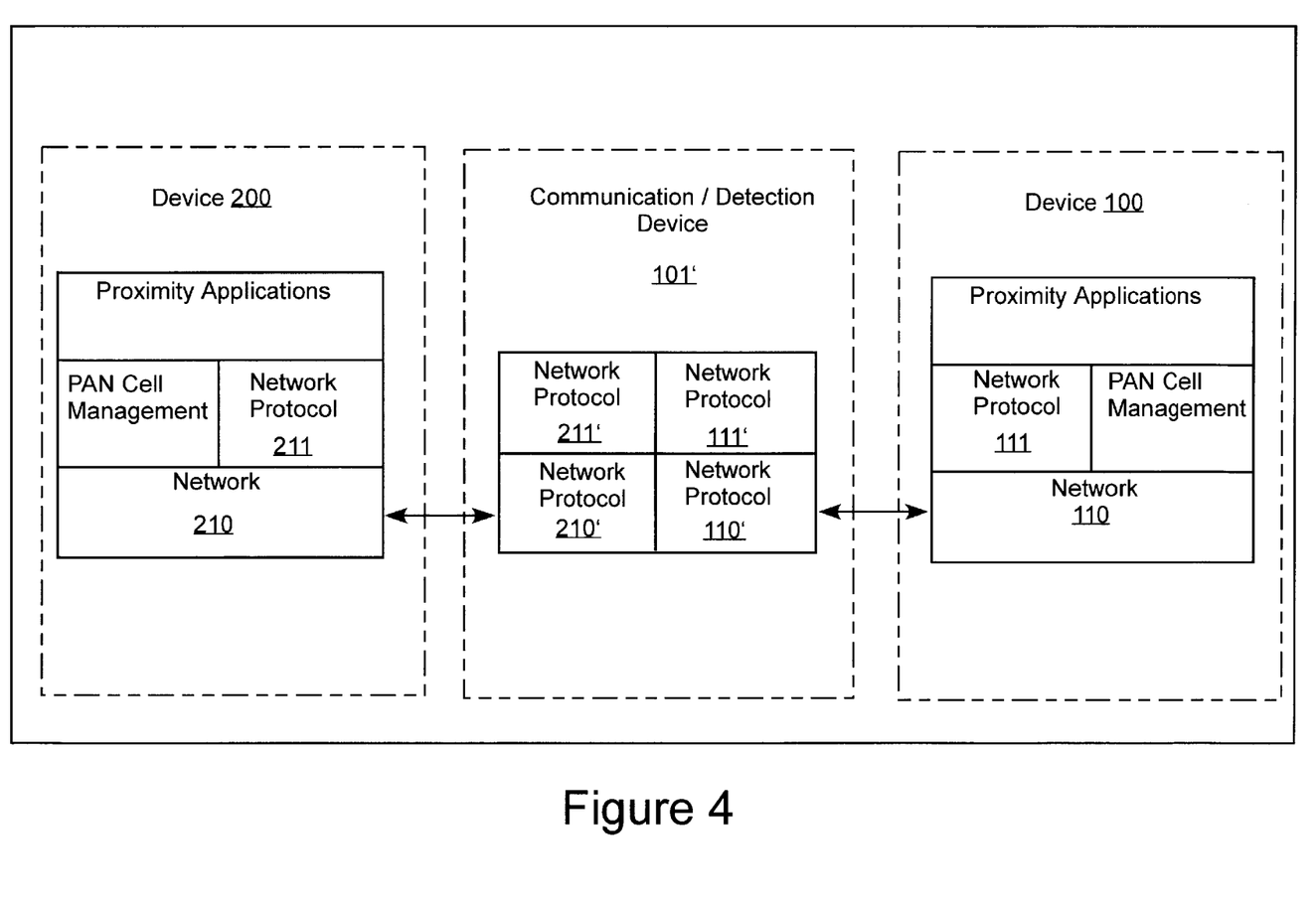
FIG. 4 illustrates an embodiment of a proximity-based device in which a communication/detection device is separated from a PAN Cell Management layer.

Wireless mobile device 100 of the present invention can communicate with other mobile devices as described above or with one or more non-mobile or stationary devices (for example, a computer or a wired network of computers and other devices). In one aspect, a mobile device 100 can communicate with an immobile communication/detection device 101' that is in communicative connection with a proximity application device 200 (for example, a server) as illustrated in FIG. 4. Together, device 200 and communication/detection device 101' logically function as a single proximity device. An important distinction between device 100 and the combination of communication/detection device 101' and device 200 is the mobility of device 100, which is preferably used by a dynamic entity that moves around. Combined device 101'/200 in this embodiment are immobile and are preferably used to provide services (for example, information, computing services etc.) to nearby dynamic entities such device 100.

Network layers 110 and 110' of devices 100 and 101', respectively, preferably include a short-range communications medium or specification that communicates through a communication unit as described above. Network layers 110 and 110' preferably provide higher layers with functionality that enables data (for example, data packets) to be sent from one device to another. Network layers 110 and 110' also preferably provide mechanisms for the determination or detection of physical proximity as described above (using, for example, the Bluetooth technology). Network layers 110 and 110' are similar in term of functionalities, however one skilled in the art will appreciate the fact that network layer of device 101' and device 100 can be readily scaled to interact with large number of proximity-enabled devices.

Network layers 210 and 210' of devices 200 and 101', respectively, can incorporate a wired or a wireless communication medium, or any combination of wired and wireless communication media, as long as Network layers 210 and 210', together with Network Protocol layers 211 and 211' provide a data communication service or link between communication/detection device 101' and device 200. Any common Network Protocol layer (for example TCP/IP, UDP/IP, or IPX) is suitable for Network Protocol layers 211, 211', 111 and 111'.

PAN Cell Management layers on both devices 200 and 100 in FIG. 4 can, for example, operate as described above. Likewise, Proximity Applications layer on both device 200 and 100 in FIG. 4 can, for example, operate as described above.

Example of Proximity Applications

The following example illustrates the operation of one embodiment of a proximity-based application in a store environment.

Figure 5:
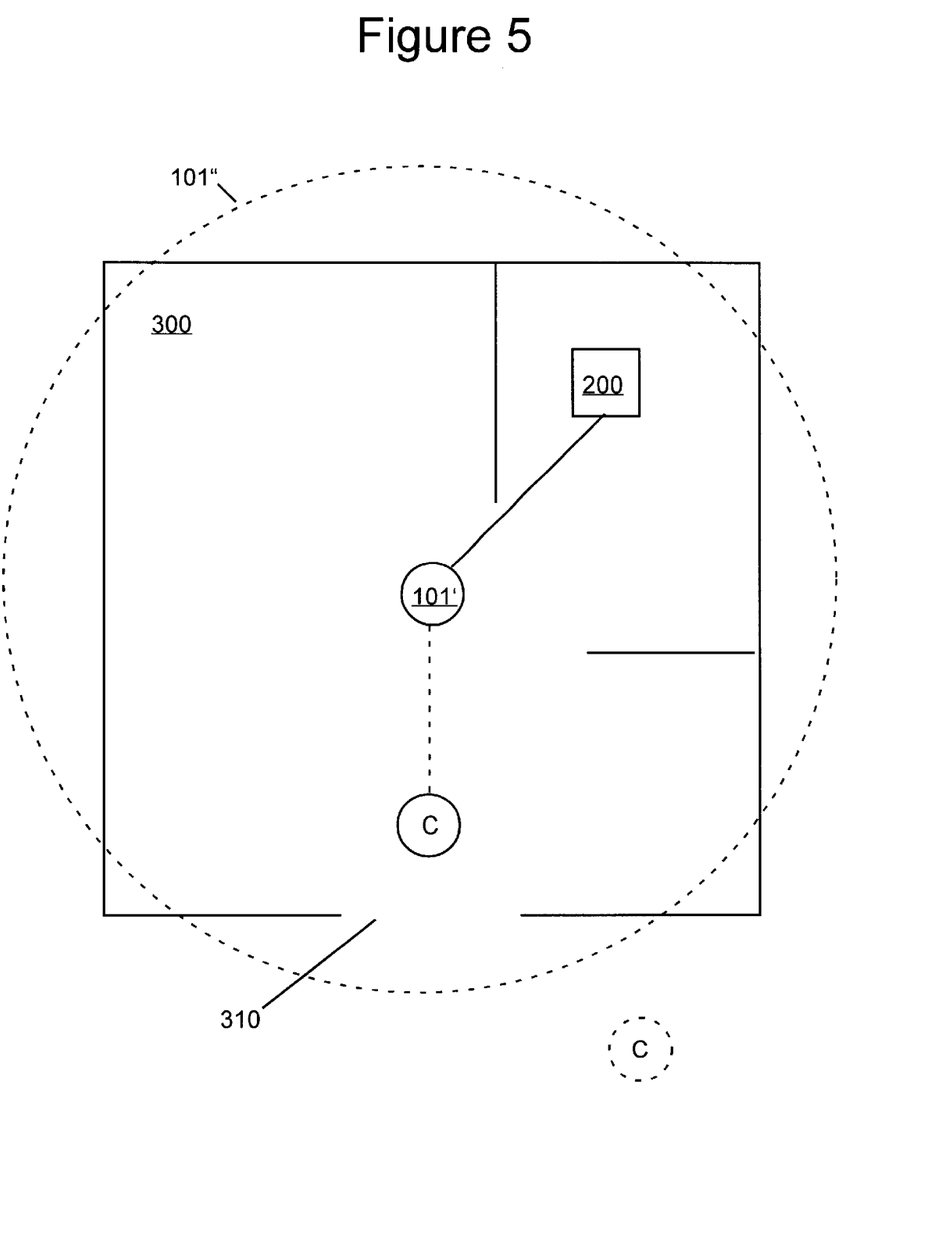
FIG. 5 illustrates an example of an application of the embodiment of FIG. 4.

FIG. 5 illustrates, for example, a retail store 300 with its rough layout depicted by solid lines indicating walls and an entrance 310. A single communication/detection device 101' is, for example, installed generally in the center of the retail store 300. Dashed circle 101" surrounding communications/detection device 101' represents the proximity communication/detection range of device 101'. A customer C equipped with a device such as device 100 enters retail store 300 at a position represented by a solid circle in FIG. 5. Network layer 110' of the communication/detection device informs PAN Cell Management on device 200 that the presence of a proximity-enabled client on the person of customer C was detected, and PAN Cell Management translates that notification into higher level time-based proximity event Enter and passes it to the Proximity Application layer. The Proximity Application layer of device 200 may perform certain actions as described above (for example, communicating information to the Proximity Application layer of the proximity-enabled client on the person of customer C). When client C later proceeds to position outside range 101" of device 101', communication/detection device 101' informs PAN Cell Management of device 200 of the absence of client C. PAN Cell Management translates that notification into a Leave event and passes it to the Proximity Application layer.

Figure 6:
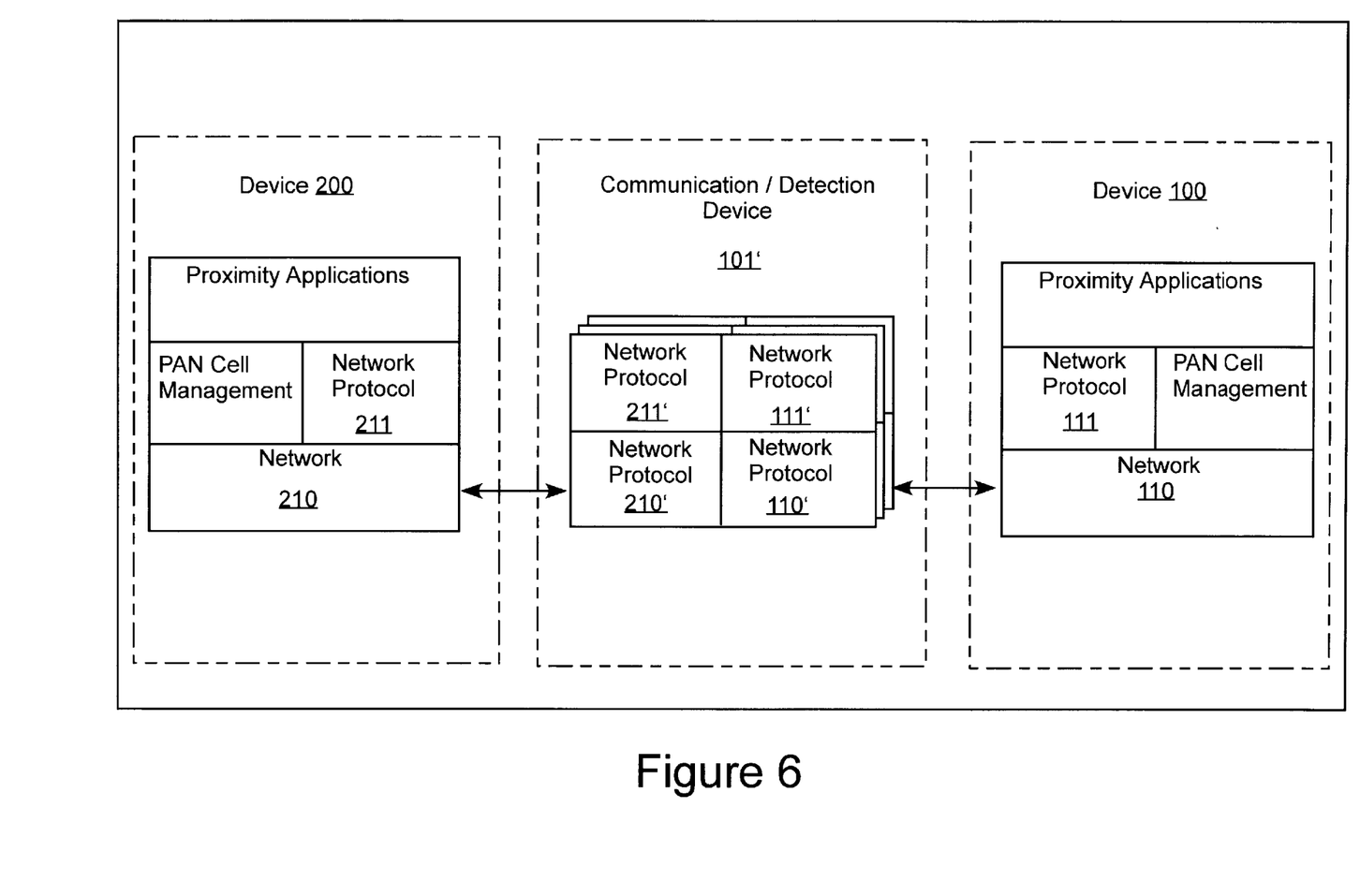
FIG. 6 illustrates an embodiment of a proximity-based device in which a plurality of communication/detection device communicates with a PAN Cell Management layer.

Multiple stationary communication/detection devices 101' can be used to, for example, cover increased area or more distinctly describe the relation of a detected mobile device. FIG. 6 illustrates a mobile device 100 in communication with one or more of a group of communication/detection devices 101' and, there through, with proximity application device 200. Each of communication/detection devices 101' is in communication with device 200 (via wired and/or wireless communication) Communication/detection devices 101' are preferably used to detect physical proximity between them and another device or devices. Together, communication/detection devices 101' can logically function as a single communication/detection device as described in greater detail below.

Network layers 110 and 110' of device 100 and devices 101', respectively, operate as described above. The same applies to Network layers 210 and 210' of device 200 and devices 101', respectively.

PAN Cell Management layer on device 200 in FIG. 6 preferably employs a more complex algorithm (than previously described) to determine the proper higher-level time-based proximity event it provides to the proximity application layer. This algorithm is dependent on the specific deployment configuration of communication/detection devices 101' and is used to surmise the current proximity state of client C with respect to the set of communication/detection devices 101'.

Example of Proximity Applications

The following example illustrates the operation of one embodiment of a proximity-based application in a store environment with multiple communication/detection devices 101a–d.

Figure 7:
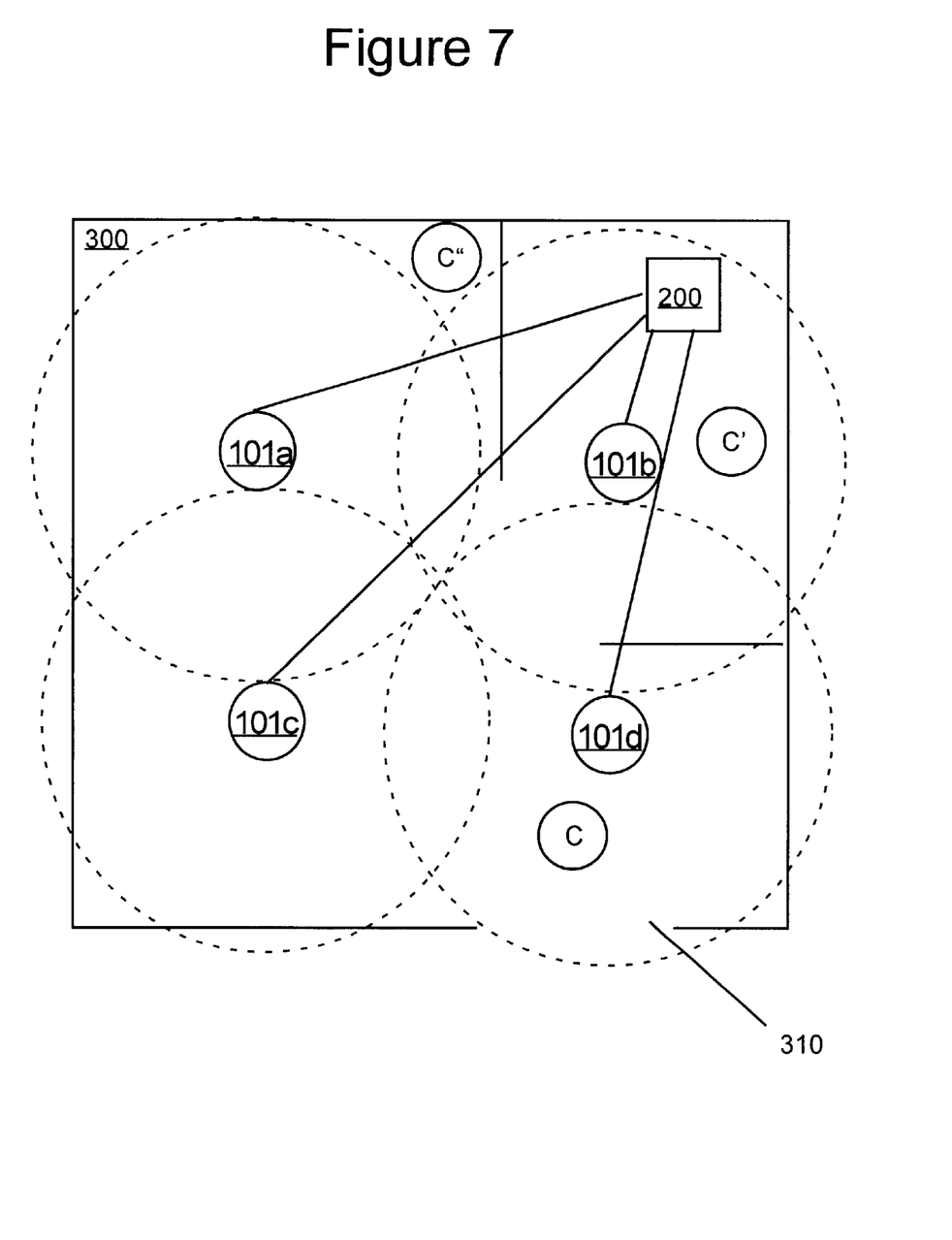
FIG. 7 illustrates an example of an application of the embodiment of FIG. 6.

FIG. 7 illustrates a retail store 300 with its rough layout depicted by solid lines indicating walls and an entrance 310. Four communication/detection devices 101a, 101b, 101c and 101d are represented as solid black circles, with corresponding surrounding dashed circles representing the proximity communication/detection ranges of communication/detection devices 101a, 101b, 101c and 101d. Device 200 is represented as a solid black square. A customer C equipped with a mobile device (for example, device 100) enters store 300. Customer C is immediately detected by communication/detection device 101d. The network layer of communication/detection device 101d informs the PAN Cell Management on device 200 of the proximity of customer C. This information will in turn be translated into the time and proximity-based event Enter by the PAN Cell Management layer, and passed on to the Proximity application layer. Applications in the Proximity Applications layer can initiate or take certain actions, such as giving customer C a coupon on goods in which he or she might be interested (by communication with the Proximity Application layer of device 100). If customer C proceeds to a position represented by the designation C', communication/detection device 101d can no longer detect the presence of customer C. However, communication/detection device 101b is able to detect the presence of customer C. Therefore, the PAN Cell Management of device 200 is aware of the continued presence of customer C. The application interactions that were taking place via communication/detection device 101d between retail store and customer C will be continued via communication/detection device 101b. If subsequently, customer C moves to a position designated by C", none of communication/detection devices 101a–d can detect customer C. However, for customer C to leave store 300, customer C must pass through the area covered by communication/detection device 101d. In other words, communication/detection device 101d must be the last communication/detection device to report detection of proximity of customer C for a Leave event to have occurred (Exit 310 is within the range of only communication/detection device 101d). Because that was not the case in the above scenario (communication/detection device 101b was the last communication/detection device to report detection of proximity of customer C), the PAN Cell Management of device 200 will continue to register customer C as present in retail store 300, despite the fact that no communication/detection device can detect customer C. The Proximity Applications layer of device 200 can pause ongoing application interactions and resume such interactions once the proximity of customer C is detected again.

Finally, if customer C, for example, traverses through the areas covered by communication devices 101a, 101c and 101d, and then exits store 300 via exit 310, PAN Cell Management of device 200 will interpret the absence of the customer as a Leave event (and, eventually, an Exit event), since communication/detection device 101d was the last communication/detection device able to pick up the presence of customer C.

The Proximity Applications layer on device 200 can, at this point, stop all application services offered to the exited customer C.

Although the present invention has been described in detail in connection with the above examples, it is to be understood that such detail is solely for that purpose and that variations can be made by those skilled in the art without departing from the spirit of the invention except as it may be limited by the following claims.

What is claimed is:

1. A device for proximity-based communication between the device and at least a second device, the device comprising:

at least one communication unit adapted to communicate between the first device and the second device in a wireless manner;

at least one network layer that includes a communication specification for communicating information between the device and the second device through the communication unit, the network layer being adapted to detect proximity between the device and the second device and communicate information regarding detection of physical proximity between the device and the second device or a lack of detection of physical proximity between the device and the second device;

a PAN Cell Management layer that receives the physical proximity information from the network layer over time, the PAN Cell Management layer translating the physical proximity detection information received over time into time- and proximity-based events; and an application layer including a memory in which at least one computer application is stored, the PAN Cell Management layer communicating information of occurrence of at least one of the time- and proximity-based events to the computer application so that the computer application can perform a task programmed to be performed on occurrence of one of the proximity-based events.

2. The device of claim 1 further including a network protocol layer that includes a protocol for transmission of data between the device and the second device through the network layer.

3. The device of claim 2 wherein network protocol layer communicates information in packets.

4. The device of claim 1 wherein the PAN Cell Management layer aggregates recurring physical proximity detection information received from the network layer over time to translate the physical proximity detection information into one of the time- and proximity-based events, the one of the time- and proximity-based events being a representation of the proximity of the device in relation to the second device at the time of translation.

5. The device of claim 4 wherein the time- and proximity-based events include an entered device proximity event, a still within device proximity event, a temporarily left device proximity event, a returned to device proximity event, and an exited device proximity event.

6. The device of claim 1 wherein the task performed by the computer application includes communication with a third device.

7. The device of claim 6 wherein the third device is in proximity with the device and the communication with the third device is wireless communication through the communication unit.

8. The device of claim 1 wherein the computer program registers in memory an interest in time- and proximity-based events for at least one other computer program on the second device.

9. The device of claim 1 wherein the communication unit, the network layer, the PAN Cell Management layer and the application layer reside in a single mobile device.

10. The device of claim 1 wherein the communication unit and the network layer are stationary and are separated in location from the PAN Cell Management layer and the application layer.

11. The device of claim 1 including a plurality of communication unit and network layer pairings, each pairing being located at a different position, each pairing being operable to detect proximity with the second device and communicate information regarding detection of physical proximity of the second device to the PAN Cell Management layer.

12. The device of claim 11 wherein the PAN Cell Management layer takes into account historical information received from each of the pairings in translating the physical proximity detection information received over time into time- and proximity-based events.

13. A method for event-based programming that operates upon the basis of proximity over time between a first device and at least a second device, the method comprising the steps of:

storing in the memory of the first device an application that performs a task on the basis of the occurrence of at least one of a plurality of time- and proximity-based events;

detecting if the first device and the second device are in physical proximity in a recurring manner over time;

aggregating recurring detection or lack of detection of the proximity of the first device and the second device over time to produce the time- and proximity-based events, the time- and proximity-based events being representative of the proximity of the device in relation to the second device at the time of production thereof;

communicating at least one of the time- and proximity-based events to the registered application.

14. The method of claim 13 wherein the time- and proximity-based events include an entered device proximity event, a still within device proximity event, a temporarily left device proximity event, a returned to device proximity event, and an exited device proximity event.

15. The method of claim 13 further comprising the step of registering in memory for the application stored on the first device an interest in time- and proximity-based events for at least one other application stored on the second device.

16. A method for event-based programming that operates upon the basis of proximity over time between a plurality of stationary communication/detection devices in communication with a stationary computing device and at least one mobile device, the method comprising the steps of:

positioning each of the stationary communication/detection devices at a unique position within an area;

storing in the memory of the computing device an application that performs a task on the basis of the occurrence of at least one of a plurality of time- and proximity-based events;

detecting if the mobile device is in physical proximity with each of the stationary communication/detection devices in a recurring manner over time;

aggregating recurring detection or lack of detection of the proximity of each of the stationary communication/detection devices and the mobile device over time to produce the time- and proximity-based events, the time- and proximity-based events being representative of the proximity of the mobile device to the area at the time of production thereof;

communicating at least one of the time- and proximity-based events to the registered application.

17. The method of claim 16 wherein the time- and proximity-based events include an entered area proximity event, a still within area proximity event, a temporarily left area proximity event, a returned to area proximity event, and an exited area proximity event.

18. The method of claim 16 wherein mobile device includes:

at least one communication unit adapted to communicate with any of the communication/detection devices in a wireless manner;

at least one network layer that includes a communication specification for communicating information between the mobile device and any one of the communication/detection devices through the communication unit, the network layer being adapted to detect proximity between the mobile device and any one of the communication/detection devices and communicate information regarding detection of physical proximity between the device and any one of the communication/detection devices or a lack of detection of physical proximity between the device and any one of the communication/detection devices;

a PAN Cell Management layer that receives the physical proximity information from the network layer over time, the PAN Cell Management layer translating the physical proximity detection information received over time into time- and proximity-based events; and an application layer including a memory in which at least one computer application is stored, the PAN Cell Management layer communicating information of occurrence of at least one of the time- and proximity-based events to the computer application so that the computer application can perform a task programmed to be performed on occurrence of one of the proximity-based events.

19. A system comprising a plurality of devices as set forth in claim 1.

* * * * *